United States Patent [19]
Rodenstein et al.

[11] Patent Number: 5,783,027
[45] Date of Patent: *Jul. 21, 1998

[54] ZIPPER FUSING MACHINE FOR ATTACHING ZIPPER MATERIAL TO A PLASTIC WEB

[75] Inventors: Larry M. Rodenstein, Newton; Bradley G. Glines, Plymouth; Theodore Amell, Brockton, all of Mass.

[73] Assignee: Park-Air Corporation, Brockton, Mass.

[*] Notice: The term of this patent shall not extend beyond the expiration date of Pat. No. 5,672,234.

[21] Appl. No.: 859,973

[22] Filed: May 21, 1997

Related U.S. Application Data

[63] Continuation of Ser. No. 430,879, Apr. 28, 1995, Pat. No. 5,672,234.

[51] Int. Cl.[6] .............................. B30B 5/06; B30B 15/34
[52] U.S. Cl. ..................... 156/494; 156/498; 156/555; 156/583.5; 100/154; 425/371
[58] Field of Search ...................... 156/494, 498, 156/555, 583.1, 583.5; 425/371; 100/154

[56] References Cited

U.S. PATENT DOCUMENTS

| | | | |
|---|---|---|---|
| 3,853,671 | 12/1974 | Ausnit | 156/580 |
| 4,304,615 | 12/1981 | Seigel | 156/73.3 |
| 4,355,494 | 10/1982 | Tilman | 53/416 |
| 4,406,719 | 9/1983 | Mitsumoto et al. | 156/52 |
| 4,537,585 | 8/1985 | Norman | 493/205 |
| 4,625,496 | 12/1986 | Ausnit | 53/451 |
| 4,659,425 | 4/1987 | Eggers et al. | 156/630 |
| 4,665,818 | 5/1987 | Held | 100/154 |
| 4,670,080 | 6/1987 | Schwarz et al. | 156/307.5 |
| 4,704,171 | 11/1987 | Thompson et al. | 156/64 |
| 5,094,707 | 3/1992 | Bruno | 493/194 |
| 5,121,683 | 6/1992 | Bielfeldt | 100/38 |
| 5,152,613 | 10/1992 | Herrington, Jr. | 383/63 |
| 5,276,950 | 1/1994 | Johnson | 24/587 |
| 5,334,127 | 8/1994 | Bruno et al. | 493/194 |
| 5,353,572 | 10/1994 | Shigeta | 53/371.5 |
| 5,378,304 | 1/1995 | Denker | 156/555 |
| 5,672,234 | 9/1997 | Rodenstein et al. | 156/494 |

FOREIGN PATENT DOCUMENTS

| | | |
|---|---|---|
| 0023817A1 | 2/1981 | European Pat. Off. |
| 2251404 | 7/1992 | United Kingdom. |
| 2254038 | 9/1992 | United Kingdom. |
| 2278803 | 12/1994 | United Kingdom. |

OTHER PUBLICATIONS

Park-Air Corporation, Auxiliary Polybag Equipment Catalog, Catalog cover and p. 27 (see Part II of the Information Disclosure Statement).

*Primary Examiner*—James Sells
*Attorney, Agent, or Firm*—Wolf Greenfield & Sacks, P.C.

[57] ABSTRACT

A zipper fusing machine is mounted on an open frame and includes a zipper supply mechanism, a zipper material fusing mechanism and a plastic web tensioning assembly. The zipper supply mechanism supplies zipper material to the fusing mechanism by a nip-roller assembly. A zipper tension assembly includes a two series of pulleys, one rotatably mounted on a support extending from the frame, the other series of pulleys are rotatably mounted on a pivot rod. The zipper material is wound between the series of pulleys in a serpentine manner. The fuse mechanism includes a pair of endless belts configured to have one vertical leg facing each other and spaced apart such that belts move passively as the zipper material and plastic web pass between the adjacent sides of the belts. A heat bar is located behind each belt and fuse the zipper material to the plastic web as they pass over the heat bar. A plastic web tension assembly is disposed below the fusing mechanism and provides tension to the plastic web as it enters the fusing mechanism whereby creasing of the plastic web is substantially eliminated.

20 Claims, 8 Drawing Sheets

5,783,027

ZIPPER FUSING MACHINE FOR ATTACHING ZIPPER MATERIAL TO A PLASTIC WEB

This application is a continuation of application Ser. No. 08/430,879, filed Apr. 8, 1995, U.S. Pat. No. 5,672,234.

FIELD OF THE INVENTION

This invention relates to a zipper fusing machine which attaches zipper material to a plastic web. More particularly, the machine of the present invention is designed to fuse zipper material to plastic web by the application of heat.

BACKGROUND OF THE INVENTION

Zipper fusing machines can be used with any of various machines which seal and cut the plastic web into reclosable plastic bags. Typically, the zipper material is attached to the plastic web and then individual reclosable bags are subsequently cut from the plastic web.

Reclosable bags, also known as zipper bags, are used for a variety of purposes. For example, zipper bags are commonly used to hold food products and are available in various sizes such as sandwich sized zipper bags. Freezer bags are sometimes made with a zipper closure to maintain a secure tight seal while the contents of the bag is in the freezer. Increasingly, zipper bags are used to package food, such as, for example, mozzarella cheese, for retail sale. Concomitant with the increasing use of zipper bags is a demand for machines that attach zipper material to plastic film.

There are many devices in the prior art which manufacture zipper material with plastic film to form a plastic reclosable bag. In one device, the zipper material and the bag material are extruded together from a machine and subsequently sealed and cut on the sides to form bags. Because the zipper material is thicker than the plastic bag material, the extrusion process is quite difficult. Another device uses extruded zipper strips which are fastened to a plastic web. The zipper material typically has flanges that extend away from the edges so that the flanges can be fixed to a bag material and hold the zipper strips to the material. A variety of different adhesives have been used to affix the zipper material to the plastic bag material. The flanges on the zipper material require that more material be used to produce the zipper and using adhesives to attach the zipper material to the plastic web involves the extra step of applying the adhesive, each of which result in a more expensive process.

Another machine which affixes zipper material to plastic web uses heat to fuse the zipper material to the plastic web. In machines of this type, the zipper material and the plastic web are melted slightly to fuse the two pieces together along a fuse line. The result is a secure attachment which is quite strong. Typically, the zipper material can have flanges which are lateral extensions along the length of the zipper. The flanges facilitate the alignment of the zipper material and the plastic web and provide a relatively wide surface to fuse. Currently, many designs of zipper material available on the market do not have flanges. Such zippers are often called "string zippers". Because string zippers do not have flanges, it can be difficult to precisely align a heat seal rail with the zipper material at economical manufacturing speeds to form the fuse. It is therefore the primary object of this invention to provide a machine capable of attaching a string zipper material to a plastic web using fusing techniques at economical manufacturing speeds.

SUMMARY OF THE INVENTION

The zipper fusing machine according to the present invention reliably fuses zipper material to a folded plastic web. The machine is designed to attach the zipper material to a plastic web at a position either proximate to the fold or proximate to the open end. The machine is capable of attaching zipper material to thin 0.00125 in. (1.25 mil.) plastic web at high speeds. The machine also is adapted to accommodate both relatively wide and narrow pieces of plastic web.

The zipper fusing machine is supported on a frame having two ends and two lateral sides. The zipper material is guided from a supply roll at one of the ends of the machine along a zipper material feed path to a fusing mechanism. A nip-roll and pulley system in the feed path regulates the speed and the tension of the zipper material such that the zipper material is properly mated with the plastic web. The plastic web is supplied from a roll positioned at a lateral side of the machine and guided into a vertical plane by rollers disposed on the bottom of the machine. The zipper material fed from a location on one end of the machine is aligned with a vertical feed path. Once the zipper material and the plastic web are aligned, the combination is fed between adjacent legs of two endless belts. The legs of the belts are spaced such that, when the zipper material and the plastic web are between the adjacent sides of belts, the belts passively move with the bag material as it is fed between the belts. Heating bars are disposed at a lower position of the inside surface of the adjacent legs of the endless belts and provide conductive heat so that both the plastic and zipper materials are slightly melted to fuse the zipper material to the plastic web. A pair of cooling bars are disposed on the vertical path above the heat bars to reduce the temperature of the fused zipper material so that the zipper material is firmly in place while traveling through the machine. A series of rollers are provided on the top of the frame to guide the fused zipper material off the machine for any post attachment processing desired. For example, the product can be rolled up and stored, or, alternatively directly fed to another machine for sealing and cutting the plastic web into zipper bags.

According to one aspect of the present invention, the heating bars in the fusing mechanism are adapted to be individually adjustable by pneumatic actuators toward and away from the inside surface of the belts. Similarly, the cooling bars are individually adjustable toward and away from the inside surface of the belts. Providing individually adjustable heating and coolings bars facilitates the proper alignment of the zipper material and plastic film between each set of the bars. Additionally, one of each of the heating and cooling bars is spring mounted on its frame to bias the heating and cooling bars against the belt.

Another feature of the present invention is the ability to fuse zipper material to very thin plastic webbing. A plastic web tension assembly provides tension to the plastic web prior to the web moving through the fusing mechanism and substantially eliminates creasing which frequently occurs when thin plastic web is moved through a fusing machine.

According to another feature of the invention, the machine can be adapted to accommodate plastic film having different widths. The fusing mechanism is movable along the longitudinal length of the frame and facilitates the accommodation of different widths of plastic web.

Finally, a feature of the machine according to the present invention is its ability to fuse zipper material near the fold by orienting the fusing mechanism in a first configuration, or, alternatively, near the open edges of the plastic webbing by orienting the fusing mechanism in a second configuration. The fusing mechanism is movable between the first configuration and the second configuration by removing bolts which mount the fusing mechanism to the support member and then turning around the fusing mechanism. The bolts are used to secure the fusing mechanism in both the alternate configurations.

BRIEF DESCRIPTION OF THE DRAWINGS

Other features and advantages will become apparent from the following detailed description and from the drawings in which.

DETAILED DESCRIPTION

Figure 1A:
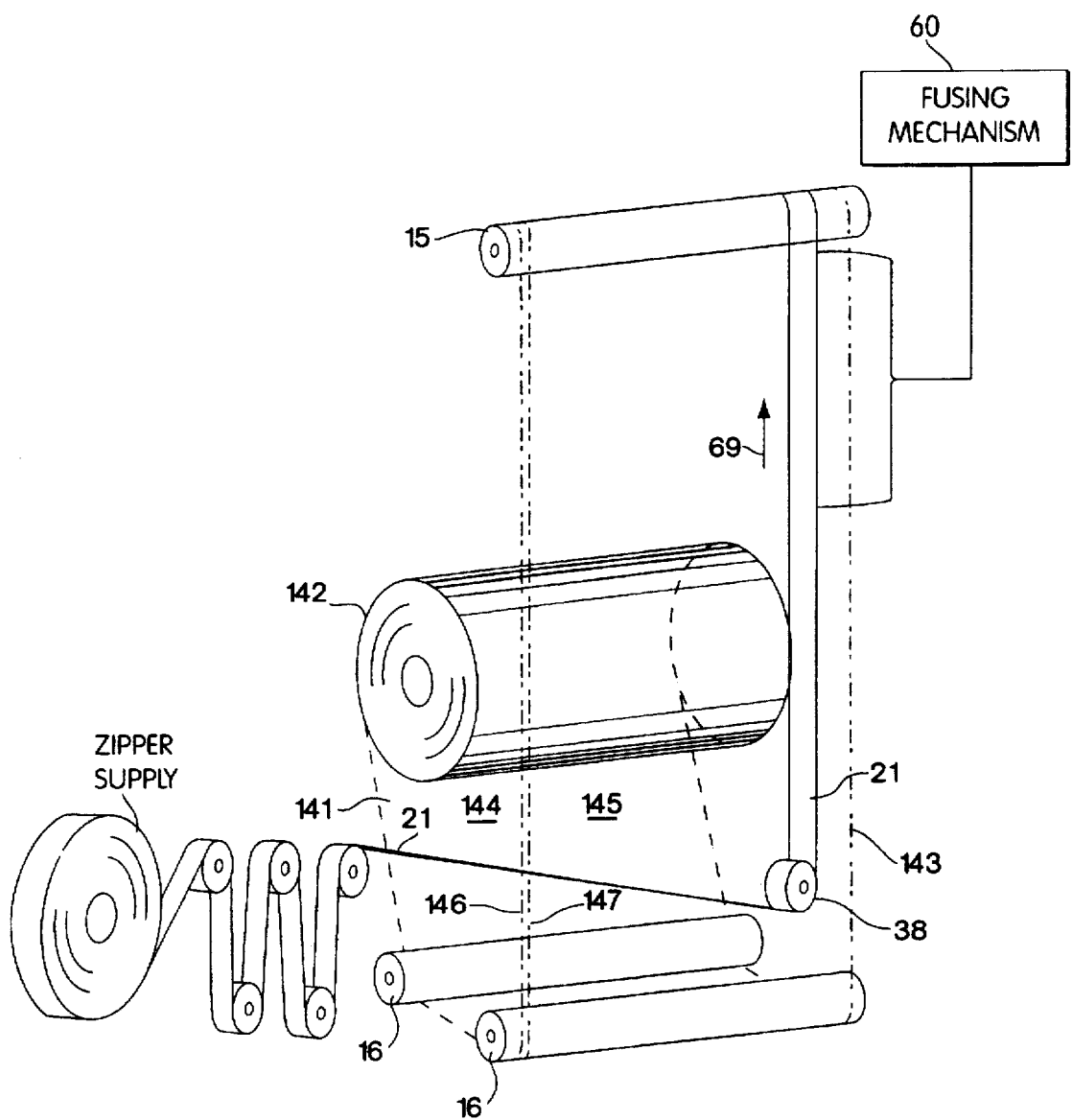
FIGS. 1A and 1B are schematic views of the alignment of zipper material and folded plastic web without the details of the machine and show the zipper material aligned close to a folded edge of the plastic web and close to the open edges, respectively.
Figure 1B:
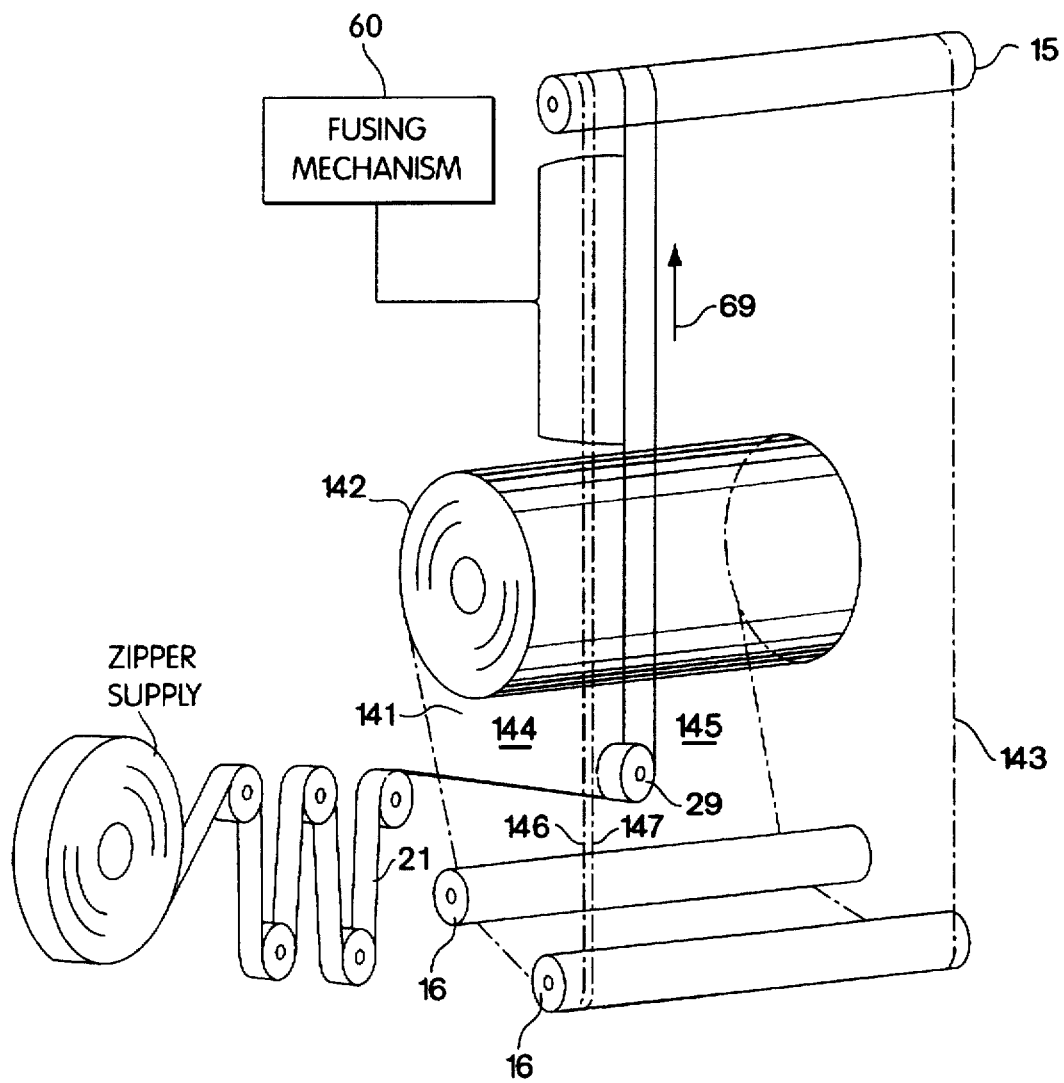

FIGS. 1A and 1B show the alignment of plastic film (or web) 141 with zipper material 21 according to the present invention without details of the machine components. The zipper fusing machine of the present invention is capable of fusing zipper material 21 to folded plastic film or web 141 close to the fold 143, as suggested by FIG. 1A, or close to outer edges 146, 147, as suggested by FIG. 1B. Referring to FIG. 1A, a cylindrical roll 142 provides plastic web 141 having a fold 143 along one edge and two opposed sides 144, 145 which extend from the fold to edges 146, 147, respectively. A roller 16 guides the plastic web into a vertical orientation. The zipper material 21 is unwound from a zipper supply, and a pulley 38 guides the zipper material 21 between the sides 144, 145 of the web to a location close to the fold 143 and in a direction parallel with the folded edge of the plastic web. The actual opening between the sides 144, 145 is shown slightly exaggerated. A fusing mechanism 60, shown as a block, fuses the zipper material between the sides of plastic web along a vertical fuse path, suggested by arrow 69. A roller 15 guides the fused components off the machine.

Alternatively, the zipper material can be fused to the plastic web close to the open edges 146, 147 as suggested in FIG. 1B. The position of the plastic web 141 is the same as shown in FIG. 1A; that is, the open edges of the folded web face toward the zipper supply. When fusing the zipper material close to the edge the fusing mechanism 60 is located at a position close to the open edges 146, 147. A pulley 29 operates to insert the zipper material between the sides 144, 145 at a location close to the edges 146, 147. The fusing mechanism 60 fuses the zipper material to the plastic web along the vertical fuse path 69. Rollers 15 guide the fused components off the machine.

Figure 3:
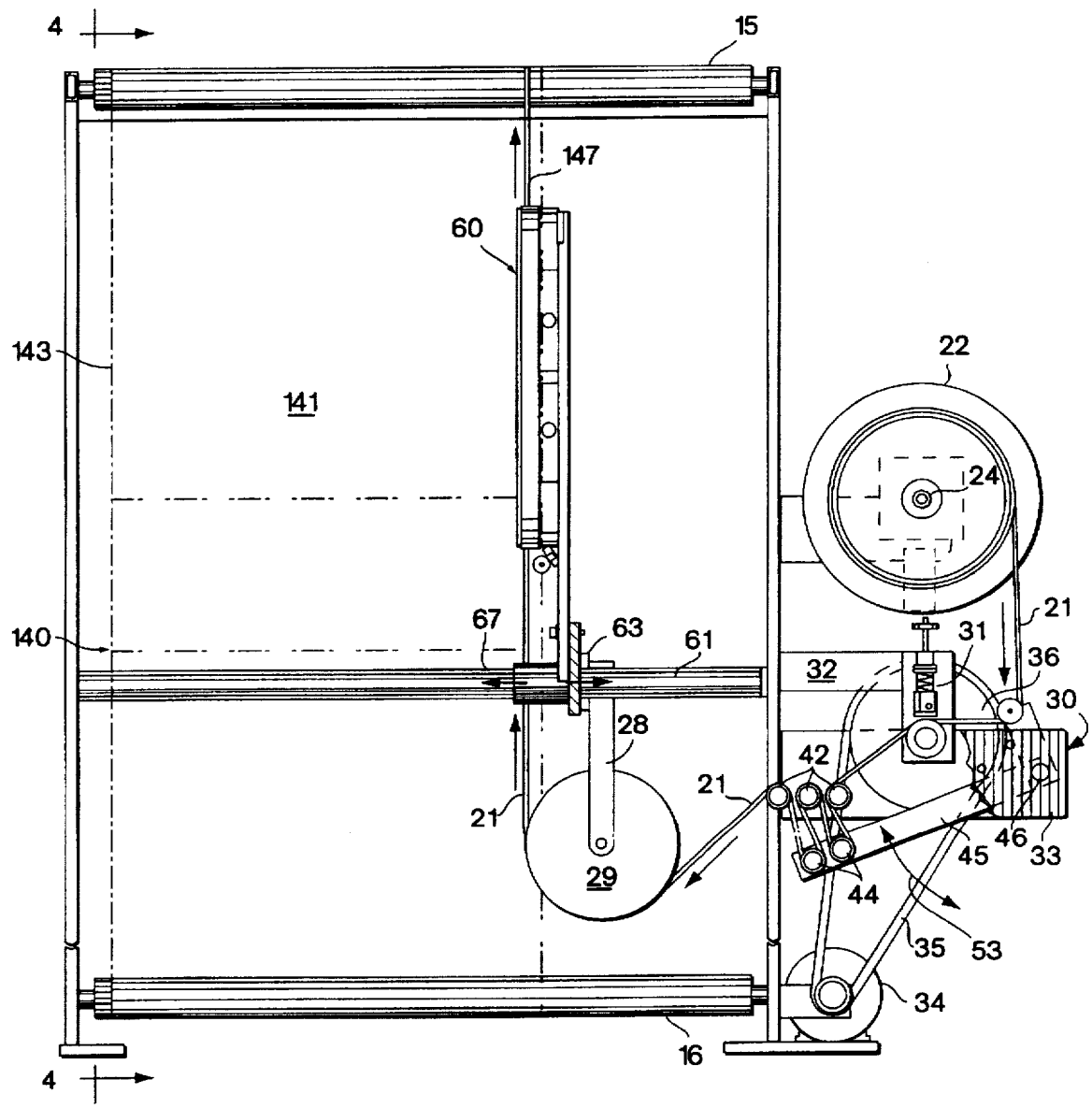
FIG. 3 is a side elevation of the zipper fusing machine of the present invention with the fusing mechanism in a second configuration and showing the path of the zipper material.
Figure 4:
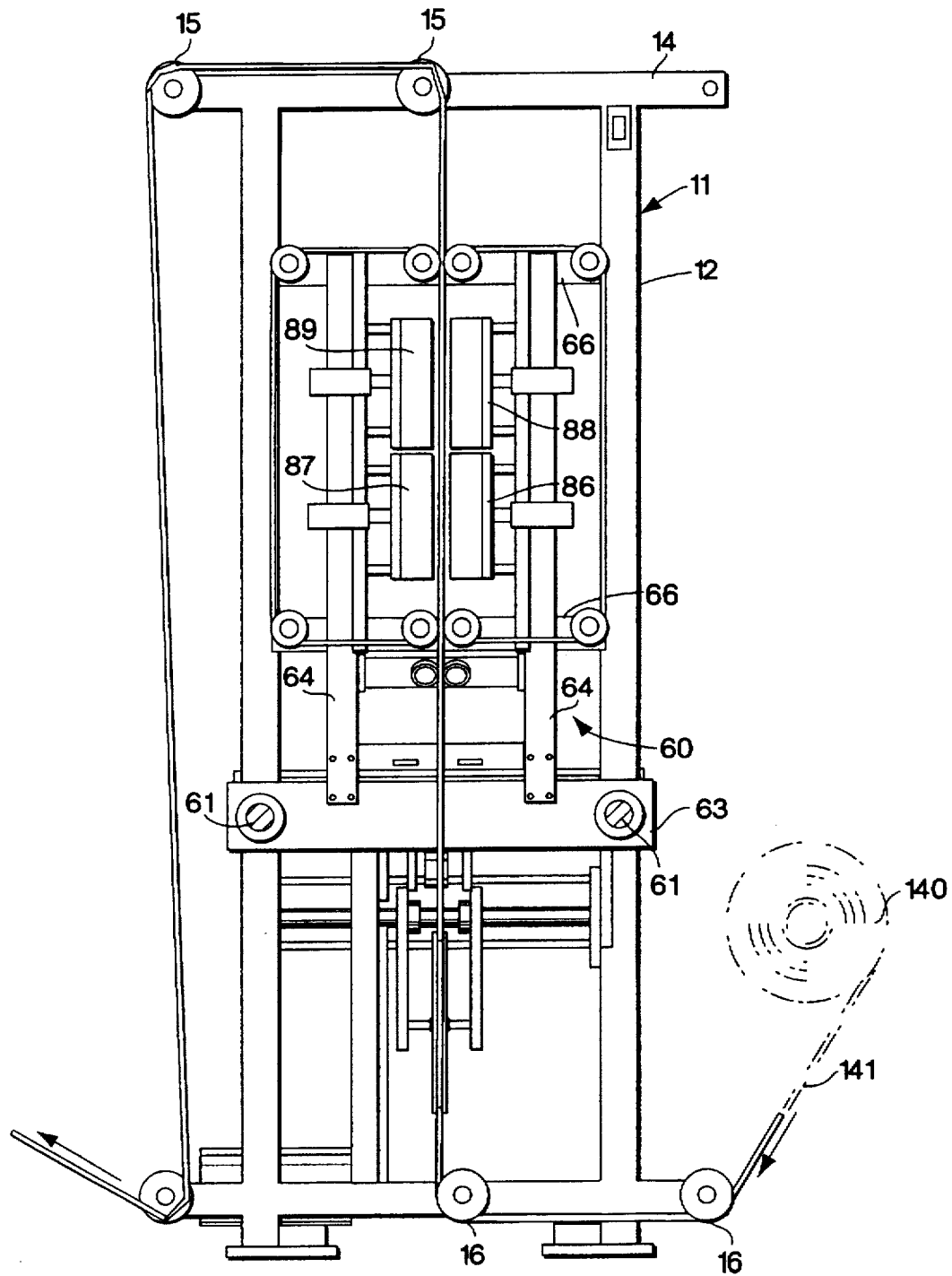
FIG. 4 is a sectional view taken along line 4—4 of FIG. 3 and shows the path of the plastic web.

The fusing machine, described in detail below has a first configuration that is capable of fusing the zipper material close to the fold (suggested by FIG. 1A) and shown in FIG. 2. The second configuration, which fuses the zipper material close to the outer edges (suggested by FIG. 1B), is shown in FIGS. 3 and 4.

Figure 2:
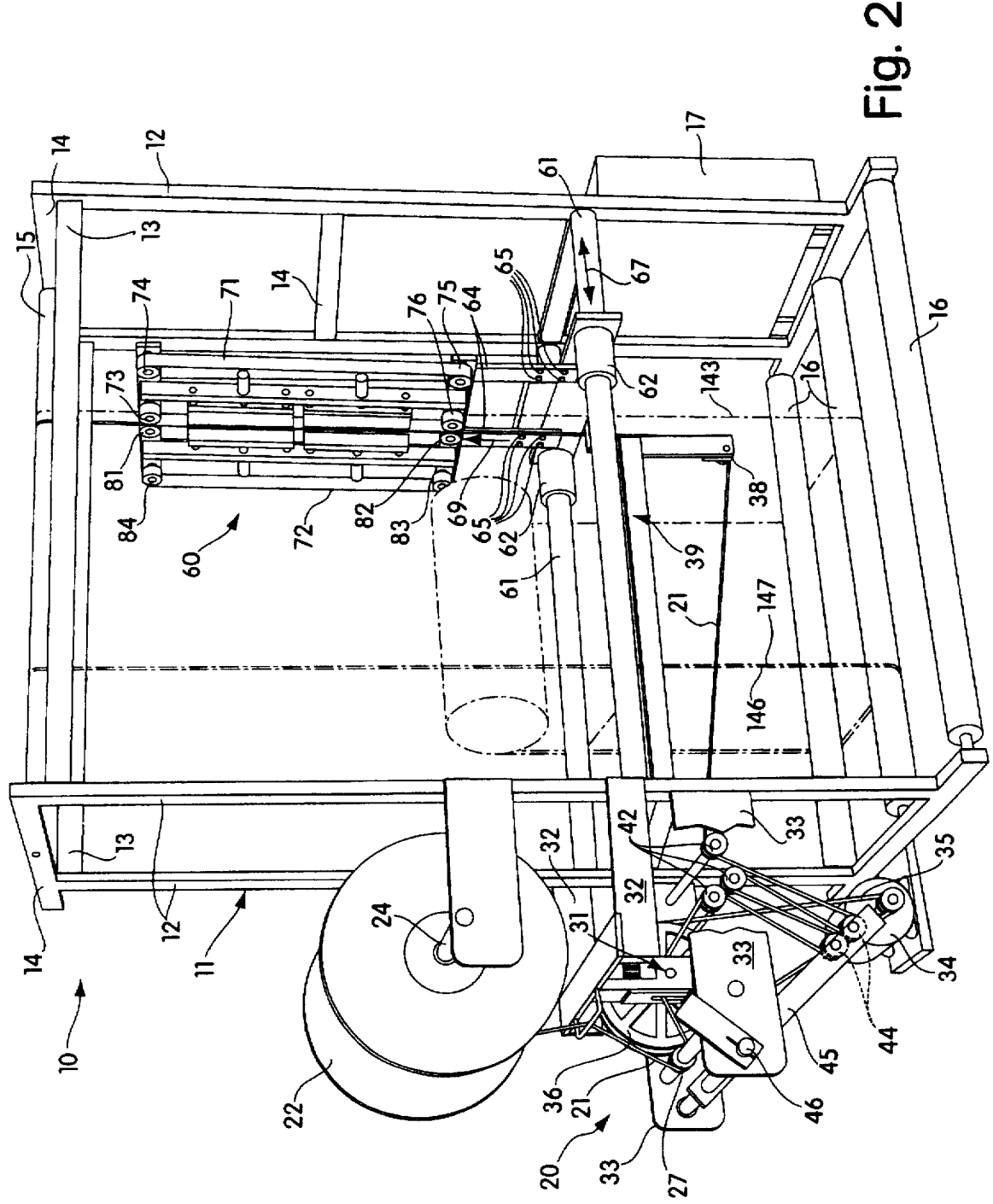
FIG. 2 is a schematic perspective view of the zipper fusing machine with the fusing mechanism in a first configuration.

Referring to FIG. 2, a zipper fusing machine, indicated generally at 10, is supported by a rectangular frame 11 having vertical supports 12, longitudinal bars 13 and lateral bars 14. The machine 10 includes the following components: a zipper feed mechanism indicated generally at 20, plastic web feed, indicated generally at 140 (shown in phantom), and a fusing mechanism indicated generally at 60. A series of horizontal cylindrical rollers 16 positioned along the bottom of the frame 11 and parallel with longitudinal bars 13 guide and align the plastic web 141 from the web feed 140 to the fusing mechanism 60. The zipper feed mechanism 20 is mounted at one end of the frame 11 and supplies zipper material 21 to the fusing mechanism 60 along a zipper feed path.

When in operation, the zipper material 21 and the plastic web 141 are aligned along the vertical path 69 prior to being fed into the fusing mechanism 60 which fuses the zipper material to the web and is mounted on longitudinally extending rails 61. A second series of cylindrical rollers 15 disposed above the fusing mechanism guide the fused material off the machine. The plastic web 141 is pulled through the machine and onto a take off roller (not shown). A control box 17 located at the end of the frame 11 opposite the zipper feed 20 controls the operation of the various components of the machine. The operation of each component of the machine is discussed in detail below.

Zipper Feed Mechanism

Figure 6:
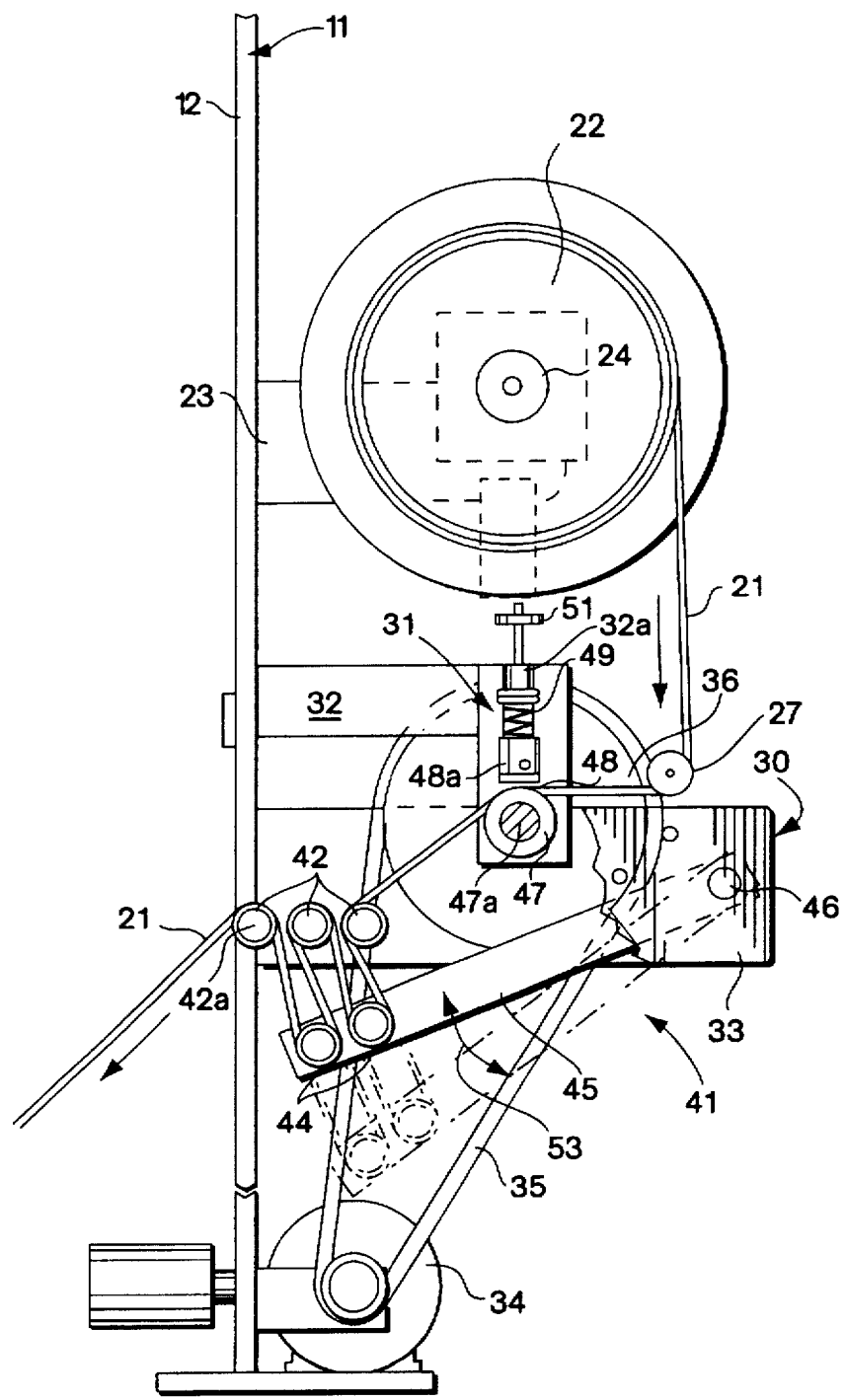
FIG. 6 is a detail side elevation view of the zipper feed mechanism shown in FIGS. 1–3.

The zipper feed mechanism 20, shown in FIGS. 2, 3 and 6, supplies the zipper material 21, which is wound on a zipper supply roll 22, to the fusing mechanism 60. Various support elements have been omitted from the drawings to more clearly show the details of the zipper supply mechanism. The mechanism 20 is supported on the end of the frame 11 by upper and lower supports 32 and 33, respectively.

The roll 22 is rotatably mounted on a rod 24 which is supported by a pair of roll supports 23 mounted on vertical supports 12 on one end of the frame 11. The zipper material 21 is pulled off the roll 22 and over an aligning wheel 27 by a nip-roll assembly, indicated generally at 31, (shown in detail in FIG. 6) mounted on nip-roll assembly supports 32a which are rigidly connected to the upper supports 32.

The nip-roll assembly 31 includes a nip roller 47 which is concentrically and rigidly mounted to a nip-roll assembly drive wheel 36 and rotatable about an axis 47a. A motor 34 which is disposed below the nip-roller 47 turns a drive belt 35 connecting the motor 34 to the wheel 36. The motor 34, which is controlled by the control box 17, operates to drive the wheel 36 and the nip-roller 47 at a desired speed. A nip-roll follower wheel 48 is rotatably mounted on support 32a on an axis 48a adjacent to the nip-roller 47. A spring 49 positioned above the wheel 48 biases the wheel against the roller 47. The zipper material 21 is positioned between the adjacent surfaces of the roller 47 and wheel 48; as the roller 47 is rotated by the motor the biasing force of the wheel 48 against the roller 47 pulls the zipper material 21 off the roll 22. The biasing force between the wheel 48 and roller 47 is adjusted by means of rotating knob 51.

After the zipper material 21 is pulled off the roll 22 by the nip-roller assembly 31, a weighted tension assembly 41, commonly called a "dancer assembly", operates to control the tension of the zipper material as it is fed to the fusing mechanism 60. The dancer assembly 41 includes two cooperating banks of pulleys 42 and 44. The first bank of pulleys 42 (three pulleys are shown) are rotatable on axes 42a which are oriented in a horizontal line on the lower support 33 at a position near the frame 11. One skilled in the art will recognize that the pulleys 42 could be mounted on the support at many suitable locations. The second bank of pulleys 44 (two pulleys are shown) are rotatably mounted on one end of an elongate dancer pivot arm 45. The other end of arm 45 is pivotably mounted to the lower support 33 at a position away from the frame 11. Of course, one skilled in the art will recognize that more or less pulleys could be used depending on desired feed rate and tension characteristics. The zipper material 21 is wound between the pulleys 42 and 44 in a serpentine fashion. That is, the zipper material 21 is wound over one pulley on bank 42 then down around one pulley on bank 44 and back up another pulley on bank 42. As shown in FIG. 6, when the machine is in operation, the arm 45 will pivot on pivot point 46 as suggested by arrow 53 and thereby maintain a substantially constant tension on the zipper material.

The zipper material 21 is fed from the zipper feed mechanism 20 to the zipper fusing mechanism 60 which fuses the zipper material 21 with the plastic web 18. As shown in FIG. 3, the zipper material is guided and aligned along the zipper feed path by an aligning pulley 29 which is rotatably mounted on one end of an elongated hanger 28. The other end of the hanger 28 is rigidly mounted to a horizontal support 63. When the zipper material is fed to the zipper fusing mechanism 60 and aligned with the plastic web along the vertical fuse path, the zipper material is fused to the plastic web.

Fusing Mechanism

Figure 5:
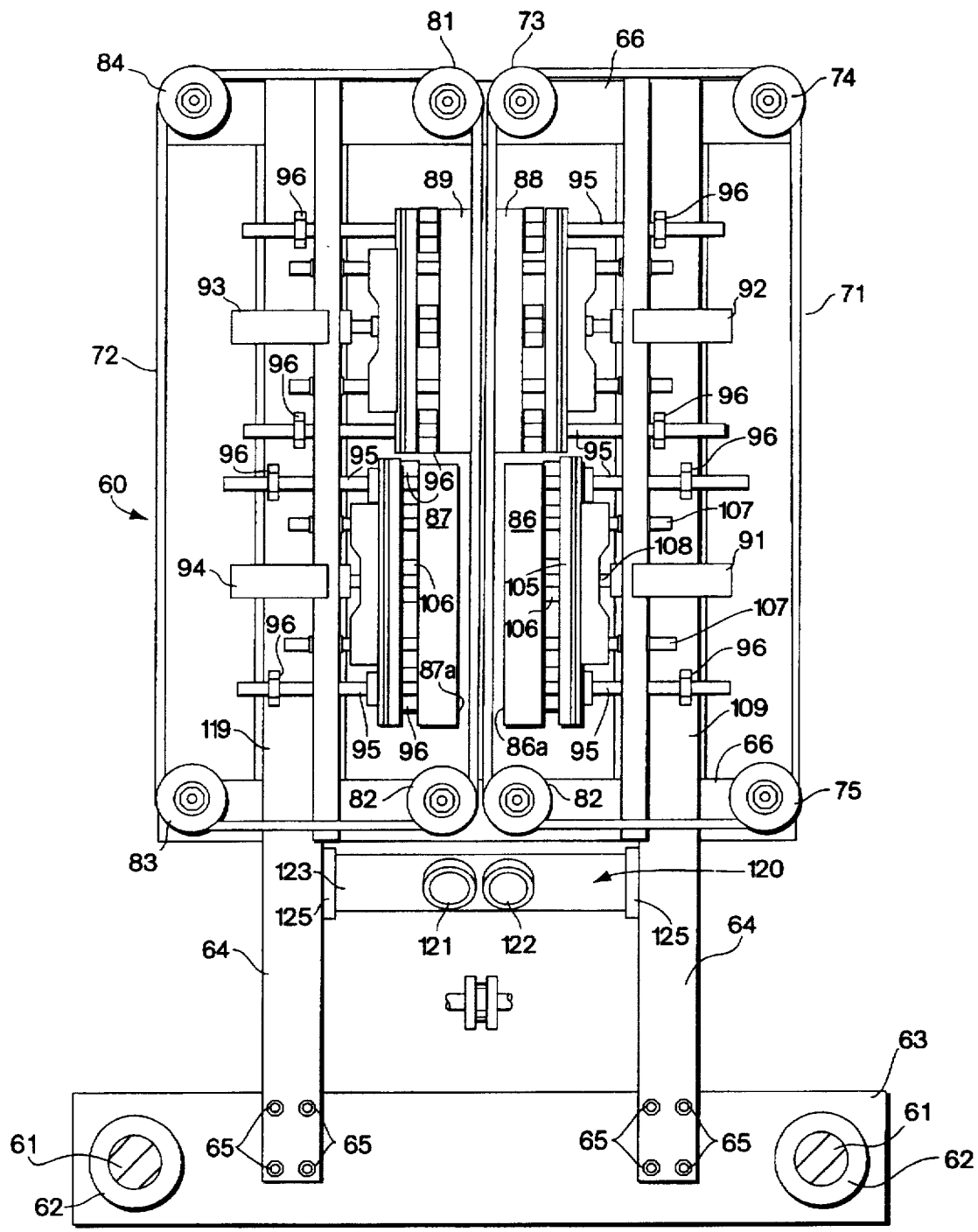
FIG. 5 is a detail front elevation view of the zipper fusing mechanism.

The fusing mechanism 60, shown in FIGS. 2 and 5, is supported on the frame 11 by rails 61 which extend the length of the frame 11 parallel to the longitudinal supports 13. The fusing mechanism 60 includes two spaced-apart vertical supports 64 which are mounted on a horizontal cross piece 63 by bolts 65. The cross piece 63 is rigidly attached to bushings 62 which are slidably mounted on the rails 61 as suggested by arrow 67 (see FIG. 2). The bolts 65 which attach the fusing mechanism to the support are removable and enable the fusing mechanism to be reoriented between a first configuration facing towards the zipper supply and a second configuration facing away from the zipper supply to alternatively fuse zipper material close to the fold 143 or close to the open edges 146, 147. FIG. 2 shows the fusing mechanism 60 in the first configuration in which it faces the zipper feed mechanism 20 and will fusing the zipper material 21 close to the fold. FIG. 3 shows the fusing mechanism 60 in the second configuration wherein it faces away from the zipper feed mechanism 20 and is adapted to fuse the zipper material 21 at a location near the open edges 146, 147.

A pair of spaced-apart horizontal bars 66 are rigidly mounted on the vertical supports 64 and form a frame onto which the fusing mechanism components are mounted. Two groups of four pulleys 73–76 and 81–84 are rotatably mounted on the horizontal bars 66. An endless belt 71 is disposed on one group of four pulleys 73–76, which are arranged in a generally rectangular fashion, and is rotatable around the pulleys. A second endless belt 72 is similarly disposed on the second group of pulleys 81–84 which also are arranged in a generally rectangular fashion. One leg (or run) of belt 72 (between pulleys 81 and 82) is positioned adjacent to one leg (or run) of belt 71 (between pulleys 73, 76). The adjacent sides of belts 71 and 72 are aligned with the path of the zipper material and are spaced to accommodate the thickness of the zipper material and the plastic web. The belts 71 and 72 rotate passively as the zipper material moves between the adjacent sides of belts 71 and 72.

A pair of heating bars 86 and 87 having contact surfaces 86a and 87a, respectively, are disposed on the inside surfaces of the adjacent sides of belts 71 and 72, respectively. The heating bars 86, 87 heat the zipper material and plastic web as it passes between the belts 71 and 72.

The heating bar 86, which is disposed behind the inside surface of the leg of belt 71 between pulleys 76 and 73, is rigidly attached to a heating bar back plate 105 by pins 106. The heating bar 86 can be made of any heat conductive metal such as aluminum and is approximately 9 inches long. Rods 95 extend from the back of the back plate 105 through apertures (not shown) in one leg of an L shaped bracket 109. The rods 95 guide the heating bar in forward and rearward motion, that is, toward and away from the belt. The other leg of the L shaped bracket 109 is rigidly mounted on the vertical support 64. Auxiliary aligning rods 107 are located inboard of the rods 95. A limit stop 96 is mounted on the outer end of each rod 95 to control the movement of the bar 86. An air cylinder 91 is disposed at the center of the back side of the heating bar 86 and controls a rod 108 which is rigidly mounted to back plate 105. The air cylinder responds to a signal from the control panel 17 (shown in FIG. 1) and moves the heating bar toward and away from the belt 71. The contact surface 86a of the bar 86 can vary from approximately 3/32 to approximately 3/16 inches wide. In FIG. 4, the heating bar 86 is shown in a position away from the belt 71.

The heating bar 87 is similarly mounted to an L shaped bracket 119. An air cylinder 94, also controlled by the control panel 17, moves the heating bar and its back plate toward and away from the leg of belt 72 between pulleys 82 and 81. The air cylinders 94 and 91 are individually controllable to facilitate aligning the plastic web 141 and the zipper material 21.

A pair of cooling bars 88 and 89 are mounted on the L shaped brackets 109, 119, respectively, above the heating bars 86 and 87, respectively. The cooling bars operate to cool the fused zipper material and plastic web to a reduced temperature wherein they are securely fused together when the fused material is removed from the machine. Chilled water is forced through the rails in conduit (not shown) in a manner well known to those skilled in the art. The cooling bars are approximately 9 inches long and are mounted on the L-shaped brackets 109, 119 in the same manner as the heating bars 86 and 87, and they move in the same way as the heating bars as described above. Air cylinders 92 and 93 are arranged on the back sides of the cooling bars and move the bars toward and away from the inside surfaces of the belts. The air cylinders are individually controlled by the control box 17 by means of a compressed air supply (not shown).

As mentioned above, the machine is capable of fusing zipper material close to the fold 143 as shown in FIGS. 1A and 2 and, alternatively, at a location close to the open edges 146, 147 shown in FIGS. 1B, 3 and 4. The machine is adjusted to perform either function simply and quickly by locating the fusing mechanism 60 either close to the fold (FIG. 2) or close to the open edges (FIGS. 3a and 4) by moving the cross piece 63 along the rails 61 as suggested by arrow 67. Since the belts 71, 72 are open on one side of the fusing mechanism 60, the mechanism must be turned around so that the belts 71, 72 face the plastic web 141. To turn the fusing mechanism, one simply removes bolts 65 from the horizontal cross piece 63 and orients the fusing mechanism 60 to face the plastic web 141. After the fusing mechanism 60 is properly adjusted to the desired configuration, the bolts 65 resecure the mechanism 60 to the cross piece 63.

When the machine is in the configuration shown in FIG. 2, a cantilevered bar 39, which extends between the sides 144, 145 of the web 141, separates the sides to allow the zipper material 21 to be positioned close to the fold 143. One end of the bar 39 is rigidly, and removably mounted to the frame 11. A pulley 38 is rotatably mounted on the other end of the bar 39 and guides the zipper material 21 in a direction parallel with the folded edge 143 of the web.

When assembling the machine into the configuration which fuses close to the open edges of the web, the cantilevered bar is removed from the frame. The fusing mechanism is moved laterally along the frame 11 on the rails 61 to a position near the open edges 146, 147 of the plastic web. The fusing mechanism is then removed from the cross piece 63 and oriented to face toward the web, as shown in FIGS. 3 and 4. The elongate bar 28 is attached to the cross piece 63 and extends downwardly from it. The pulley 29 is rotatably mounted on the lower end of the elongate bar 28. The pulley 29 guides and aligns the zipper material into a path which is parallel with and close to the open edges 146 and 147. Alternatively, the cantilevered bar 39 (shown in FIG. 2) may be shortened so that the aligning pulley 38 extends between the sides 144, 145 the proper distance which will align the zipper material with the plastic web close to the open edges 146, 147.

The Web Retention Assembly

Figure 7:
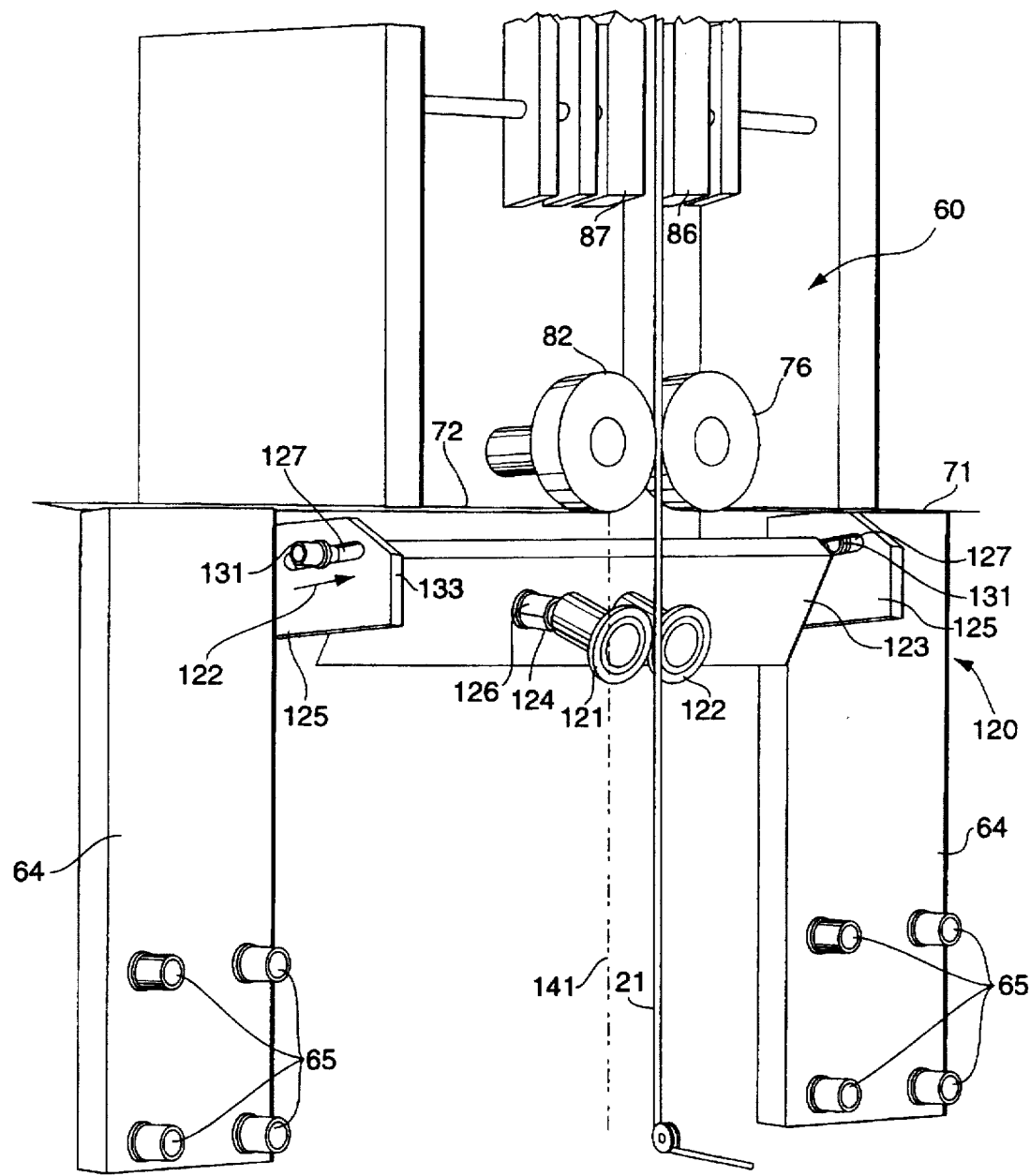
FIG. 7 is a detail view of tensioning wheels located beneath the zipper fusing mechanism.

When zipper material is attached to thin plastic web (approx. 1.25 mil.), one problem commonly experienced with devices of the prior art is that the plastic web is not accurately aligned with the zipper material. This lack of alignment causes unsightly creases to form along the fuse line creates gaps in the seal between the zipper material and the plastic web. In order to overcome this difficulty, a plastic web retention assembly 120 provides a desired amount of tension on the plastic web to prevent creases. The assembly is located beneath the fusing mechanism 60. As shown in detail in FIG. 7, the retention assembly includes two rollers 121, 122 which are mounted on a horizontal bar 123.

The web material 141 (shown in phantom) passes between the rollers 121, 122 and causes the rollers to rotate passively as plastic web moves through the machine. The rollers provide tension by applying a load to the plastic web 141 and eliminate unsightly creasing and promotes a secure seal between the web and the zipper material.

The position of the tension assembly 120 is movable in three directions to assure that the tension assembly is properly placed relative to the web. First, the roller 121 is movable with respect to the roller 122 along an elongate slot 124. A bolt 126, partially shown through the slot in FIG. 7, secures the roller 121 at a desired position relative to the roller 122. The bar 123 is supported by a pair of brackets 125, one at each end of the bar 123. A pair of bolts 131 extend through horizontal slots 127 in the brackets and are threaded into the bar 123 to secure the bar to the brackets 125. When the bolts 131 are loosened, the bar 123 is movable along the distance of the slot 127 as suggested by arrow 128. Also, when loosened, the rotational orientation of the bar 123 may be adjusted as suggested by arrow 133. The slot 124 on the bar 123 and slots 127 on the brackets 125 provide for a full range of adjustment and allow proper alignment between the rollers 121, 122 and the web.

The inclusion of the web retention assembly 120 enables the machine to fuse thin plastic web at a faster rate of speed than the prior art. For example, with this device, plastic web having 1.25 mil. thickness can be fused at a speed of about 200 ft/min.

Having described the components of the zipper fusing machine, the operation of the machine is now described. With reference to FIG. 2, the roll 22 of zipper material 21 is mounted on one end of the frame 11 on the rod 24. The nip-roller assembly 31 pulls the zipper material off the roll 22 at a constant speed. The zipper material moves between pulleys 42, 44 of the dancer assembly in a serpentine fashion. The dancer assembly provides a constant tension on the zipper material as it moves toward the fusing mechanism 60. The tension is maintained by the pivot arm 45 which pivots about pivot point 46 according to the tension required to supply the zipper material to the fusing mechanism 60. The plastic web is pulled through the machine by a take-up roller assembly (not shown). Of course, the feed rate of the zipper material must be the same as the feed rate of the plastic web.

The pulley 38 guides the zipper material to the fold and orients it parallel with the fold. Once aligned, the material travels along the zipper fusing path toward the fusing mechanism. As shown in FIG. 2, the fold 143 of the plastic web 141 is adjacent the fusing mechanism 60 and the open edges 146, 147 of the plastic film are oriented away from the fusing mechanism 60. The rollers 16 align the plastic web with the zipper fusing mechanism 60 so that the web is oriented along the fuse line.

As the plastic web travels upwardly from the center roller, cantilevered bar 39 and pulley 38 separate the sheets 144 and 145 of the plastic web enough to enable the zipper material to be inserted between the sheets before they reach the zipper fusing mechanism 60. As the zipper material and plastic web travels along the vertical path, they move between two belts 71, 72 with the adjacent legs of the belts on each side of the vertical path. Heating bars 86, 87 heat the plastic web and the zipper material enough to melt the two slightly and fuse them together. The fused material is then subsequently cooled by the cooling bars 88, 89 which are located above the heating bars 86, 87 on the fuse path. The cooling bars cool the fused material enough to enable them to be pulled off the machine along rollers 15.

In light of the above description, modifications within the scope of this invention may occur to those skilled in the art. The above description is intended to be exemplary only, and the scope of the invention is defined by the following claims and their equivalents.

What is claimed is:

1. A machine for fusing a plastic zipper material to a length of a plastic bag film, the plastic bag film including a first edge and a second edge extending along the length thereof and having a width between the first edge and the second edge, the machine comprising:

a frame having opposing first and second sides;

a plurality of guide rollers mounted on the frame in a longitudinal direction between the first and second sides, the guide rollers being arranged to guide the plastic bag film through the frame with the width of the plastic bag film extending across the frame in the longitudinal direction;

a fusing mechanism constructed and arranged to fuse the zipper material to the plastic bag film, the fusing mechanism being mounted on the frame and movable in the longitudinal direction for alignment with a selected fuse path between the first and second edges of the plastic bag film; and a zipper supply mechanism constructed and arranged to feed the zipper material along the fuse path.

2. The machine recited in claim 1, wherein the fusing mechanism includes a pair of heaters disposed on opposite sides of the fuse path to fuse the zipper material to the plastic bag film disposed in the fuse path.

3. The machine recited in claim 2, wherein the fusing mechanism further includes a pair of endless belts disposed on opposite sides of the fuse path, the belts having leg portions disposed between the heaters and the fuse path, each leg portion being arranged to be parallel to and closely spaced from the zipper material and the plastic bag film in the fuse path.

4. The machine recited in claim 2, wherein the heaters are movable toward and away from the fuse path.

5. The machine recited in claim 4, wherein the heaters are movable independent of each other.

6. The machine recited in claim 2, wherein the fusing mechanism further includes a pair of coolers disposed on opposite sides of the fuse path to cool the fused zipper material and the plastic bag film disposed in the fuse path.

7. The machine recited in claim 6, wherein the fusing mechanism further includes a pair of endless belts disposed on opposite sides of the fuse path, the belts having leg portions disposed between the heaters and the fuse path and between the coolers and the fuse path, each leg portion being arranged to be parallel to and closely spaced from the zipper material and the plastic bag film in the fuse path.

8. The machine recited in claim 6, wherein the heaters and coolers are movable independent of one another toward and away from the fuse path.

9. The machine recited in claim 1, wherein the fusing mechanism is constructed and arranged to continuously fuse the zipper material to the plastic bag film.

10. The machine recited in claim 1, wherein the zipper supply mechanism is mounted on the frame.

11. A zipper fusing machine for fusing zipper material to plastic bag film, the zipper fusing machine comprising:

a frame;

a zipper fusing mechanism mounted on the frame to fuse the zipper material to the plastic bag film along a fuse path disposed between opposite edges of the plastic bag film; and a zipper supply mechanism mounted on the frame to supply the zipper material to a feed path, the zipper supply mechanism including a nip-roll assembly to feed the zipper material and a zipper tension assembly to adjust the tension of the zipper material along the feed path, the nip-roll assembly comprising first and second opposed rollers, the first roller being a driving roller, the second roller being a driven roller and biased toward the first roller so that when the zipper material is placed between the first and second opposed rollers and the driving roller is rotated, the zipper material is forced between the opposed rollers.

12. The zipper fusing machine recited in claim 11, wherein the zipper tension assembly includes a pivot arm pivotally mounted on the frame and first and second series of pulleys, the first series of pulleys being mounted on a fixed support, the second series of pulleys being mounted on the pivot arm, the pulleys being arranged to guide the zipper material along the feed path in a serpentine manner.

13. The zipper fusing machine recited in claim 11, wherein the zipper tension assembly is a weighted tension assembly.

14. The zipper fusing machine recited in claim 11, wherein the zipper fusing mechanism includes a pair of heaters disposed on opposite sides of the fuse path to fuse the zipper material to the plastic bag film disposed in the fuse path.

15. The zipper fusing machine recited in claim 14, wherein the zipper fusing mechanism further includes a pair of coolers disposed on opposite sides of the fuse path to cool the fused zipper material and plastic bag film.

16. The zipper fusing machine recited in claim 11, wherein the zipper fusing mechanism is movably mounted on the frame so as to be aligned with the fuse path.

17. The zipper fusing machine recited in claim 11, further comprising a bag film tension assembly disposed along the fuse path to subject the plastic bag film to a tension that substantially eliminates creasing of the plastic bag film along the fuse path.

18. The zipper fusing machine recited in claim 17, wherein the bag film tension assembly is mounted on the zipper fusing mechanism.

19. The zipper fusing machine recited in claim 17, wherein the bag film tension assembly is constructed and arranged to be moved relative to the fuse path to adjust the tension.

20. The zipper fusing machine recited in claim 19, wherein the bag film tension assembly is pivotally mounted about a longitudinal axis that is perpendicular to the fuse path.

* * * * *